United States Patent [19]

Perez

[11] Patent Number: 5,784,997
[45] Date of Patent: Jul. 28, 1998

[54] BALE MANGER

[76] Inventor: Rafael Perez, 176 Perez Cove, Braxton, Miss. 39044

[21] Appl. No.: 840,663

[22] Filed: Apr. 25, 1997

Related U.S. Application Data

[60] Provisional application No. 60/016,801 Apr. 26, 1996.

[51] Int. Cl.⁶ ..................................................... A01K 1/10
[52] U.S. Cl. ............................................................. 119/60
[58] Field of Search ........................................... 119/58, 60

[56] References Cited

U.S. PATENT DOCUMENTS

| 4,067,298 | 1/1978 | Jones et al. | 119/60 |
| 5,331,922 | 7/1994 | Olynyk | 119/58 |

FOREIGN PATENT DOCUMENTS

| 215549 | 6/1958 | Australia | 119/58 |
| 2203322 | 10/1988 | United Kingdom | 119/60 |

*Primary Examiner*—Thomas Price
*Attorney, Agent, or Firm*—Jay M. Cantor

[57] ABSTRACT

A bale manger which includes a bed and rear wall extending substantially normal to the bed. A front wall is opposed to and spaced from the rear wall. The front wall is pivotally connected about a pivot to an end portion of the bed and has a bend therein to permit a first portion of the front wall remote from the bed to lie in a plane parallel to and below the bed when the front wall is appropriately pivoted. A second portion of the front wall between the bed and the first portion of the front wall makes an obtuse angle with the first portion. The bed is elevated. A pair of side walls which are preferably secured to the bed make an enclosure with the bed, front wall and rear wall when the front wall is pivoted in a direction toward the rear wall. The front wall is pivoted by a structure which causes the front wall to rotate about the pivot toward the rear wall. A preferred such structure is a pulley secured to the rear wall and a cable securable to the front wall and rotatable by the pulley.

18 Claims, 2 Drawing Sheets

BALE MANGER

This is a continuing application of provisional application 60/016,801 filed on Apr. 26, 1996.

BACKGROUND OF THE INVENTION

1. Field of the Invention

This invention relates to bale mangers and principally, but not limited to, bale mangers for management of cylindrically shaped bales of hay for use as for a livestock feeder.

2. Brief Description of the Prior Art

Livestock are often fed from large, generally cylindrically shaped bales of hay, often on the order of 1000 pounds or more and, in general, too heavy for an individual to lift manually. While it is generally easy to transport such bales of hay to the site of their use, the bales are then generally left on the ground. It is desirable, however, to store the hay out of contact with and above the ground to reduce waste, since the hay that comes in contact with the ground often rots. This means that, not only the baled hay contacting the ground can rot, but also the hay which drops to the ground during feeding can also rot. However, due to the massive size and weight of bales of hay, either several persons or automatic equipment are required to lift the bales above the ground and onto a feeder.

SUMMARY OF THE INVENTION

In accordance with the present invention, there is provided a bale manger for use in conjunction with bales of hay, preferably of cylindrical shape, which is capable of lifting large and heavy bales of hay off of the ground and into position for feeding of livestock with provision to prevent the bale or a large portion thereof from being removed from the manger. This can generally be accomplished by an individual using the present invention.

Briefly, the above is accomplished by providing an elevated bed having back and side walls formed of spaced apart pipes or the like to provide space for livestock to feed therethrough. These walls extend upwardly from the elevated bed and prevent the bales or any large portion thereof from being removed therethrough, thereby retaining the bale on the elevated bed. A front wall is also provided which is rotatably connected to the elevated bed. The front wall is sufficiently long and shaped such that a portion of the front wall can be rotated to rest on the ground and substantially parallel to the ground whereby a bale of hay can be rolled onto that portion of the front wall. A crank or other power providing device controls a pair of cables secured to opposite ends of the front wall and pulls the front wall with bale thereon toward the back wall so that the bale ultimately will roll off of the front wall and onto the bed. The front wall continues to be rotated until a portion thereof rests on the upper surface of the bale and provides a downward force to the bale as well as acting as a side wall. The result is that the bale is elevated from the ground and is surrounded by a wall on all four sides and at least a portion of the top. By applying a continual force or periodic force to the cables, the front wall can continue to be rotated as the size of the bale diminishes due to use to minimize hay removal from the top of the bale due to wind or the like.

DESCRIPTION OF THE PREFERRED EMBODIMENT

Figure 1:
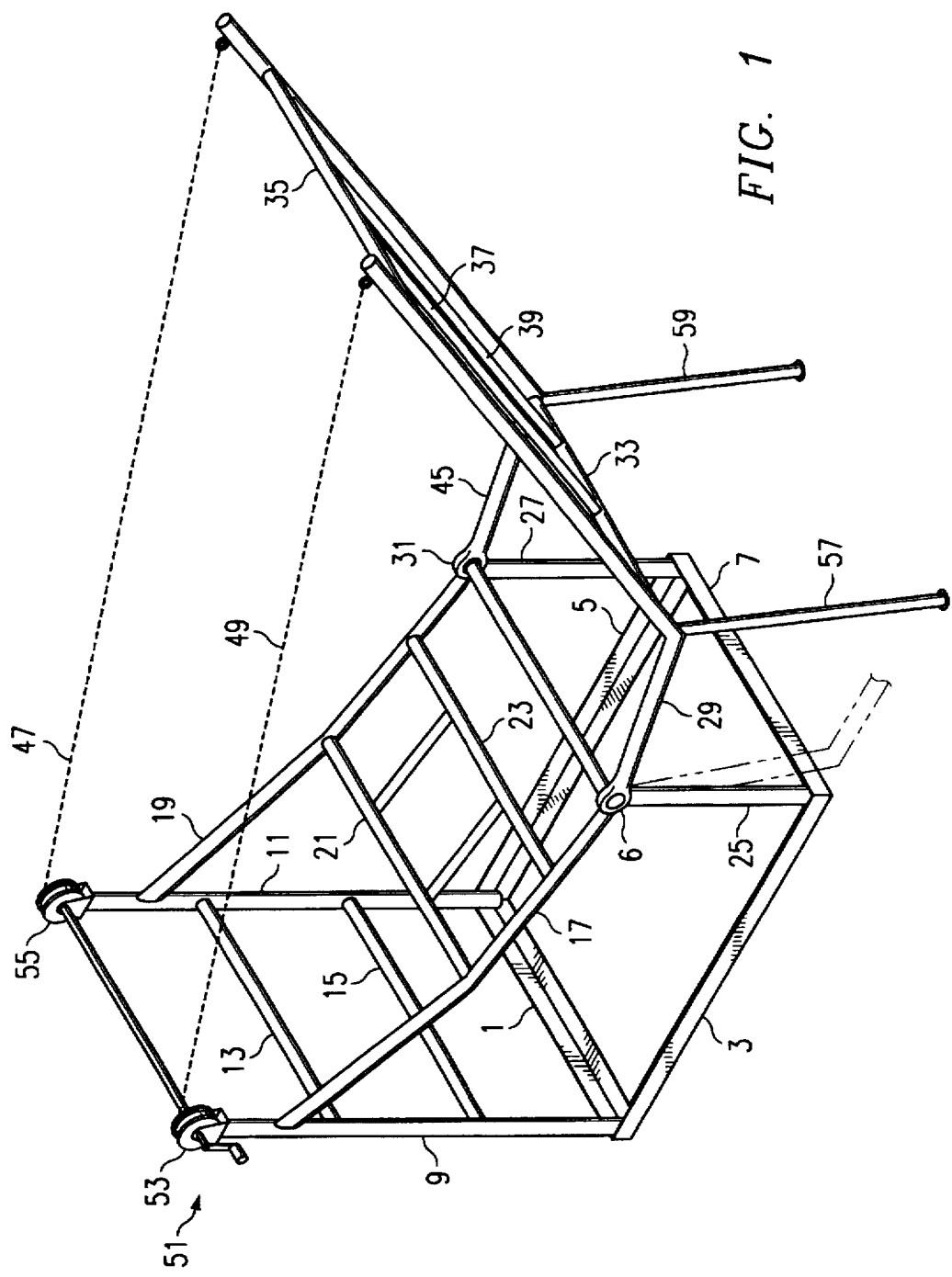
FIG. 1 is a perspective view of the bale manger in accordance with a first embodiment of the present invention with the side walls removed.

Referring to FIG. 1, there is shown a frame which rests on the ground formed of four pipes 1, 3, 5 and 7 secured to each other to form a rectangle. Extending upwardly from and secured to each of the ends of the pipe 1 are pipes 9 and 11 which are stabilized by horizontally positioned pipes 13 and 15 which are secured to the pipes 9 and 11 and form the back wall therewith. A pair of pipes 17 and 19 having an angle therein are secured to the pipes 9 and 11 and are stabilized by pipes 21 and 23. Extending upwardly from and secured to each of the ends of pipe 7 are pipes 25 and 27. The other end of pipe 25 is coupled to the other end of pipe 17 and to an end of angled pipe 29 whereas the other end of pipe 27 is coupled to the other end of pipe 19 and to and end of angled pipe 31. A pipe 33 is secured to the angled portion of each of pipes 29 and 31 and a pipe 35 is secured to portions of the pipes 29 and 31 remote from the angled portion. A pair of pipes 37 and 39 are secured between the pipe 33 and the pipe 35. The pipes 29 and 31 are pivotally secured at pivots 43 and 45 so that the wall including pipes 29 and 31 can swing about the pivots. The safety braces 57 and 59 are optional and are removed when loading a bale of hay onto the front wall. It should be understood that, as an alternative embodiment, the pipes 17 and 19 can be straight and be disposed parallel to the ground so that it acts as the bed for the bale.

Figure 2:
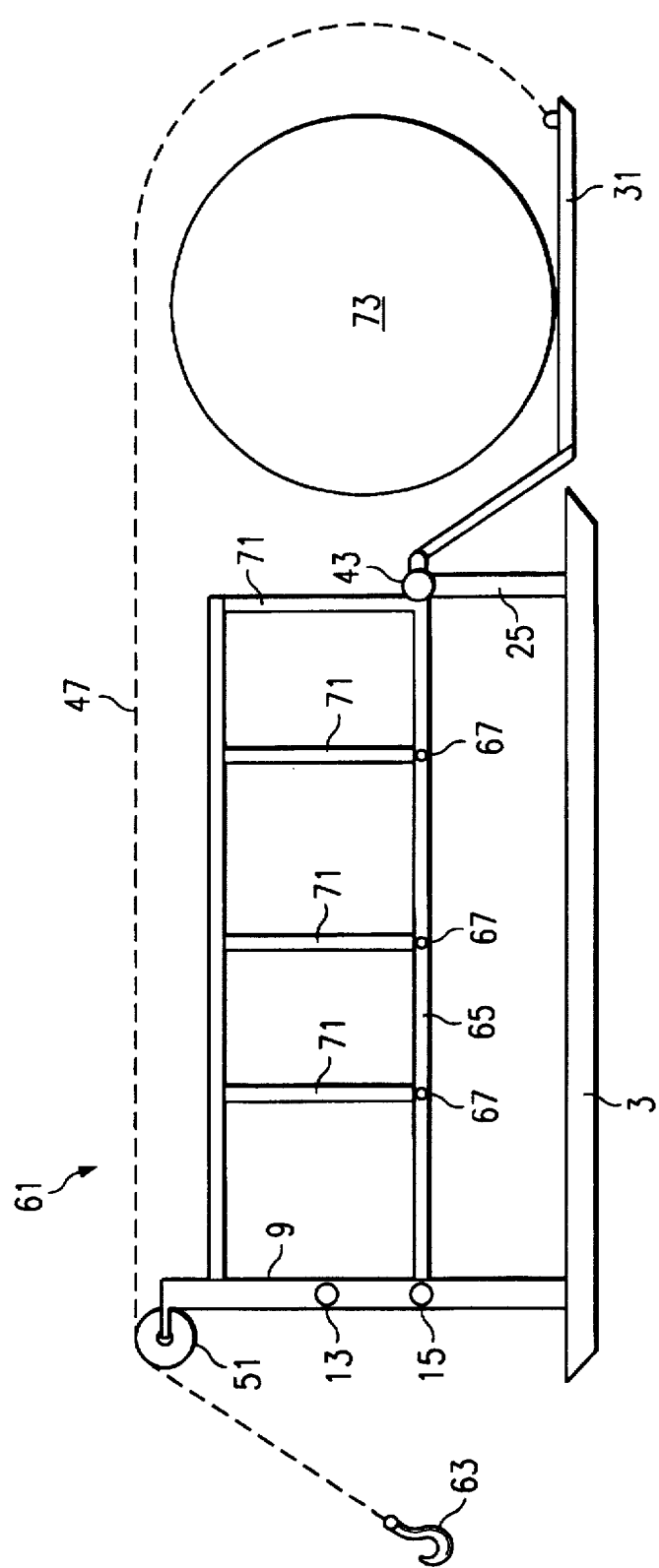
FIG. 2 is a side view of a bale manger in accordance with a second embodiment of the present invention with side walls and with the front wall in position for loading of a bale of hay thereon.

As an alternative embodiment, as shown in FIG. 2 where like reference number refer to like structure as in FIG. 1, a pair of side walls are provided on opposing sides of the bed to form an enclosure with the back wall as in FIG. 1. One of these walls 61 is shown secured between the pivot 43 and the pipe 9 in FIG. 2. The other side wall is connected in similar manner between the pivot 45 and the pipe 11. The walls include an upper rail 69, a cross member 65 and vertical pipes 71 connected between the upper rail 69 and cross member 65. The bed or floor is composed of the pair of spaced apart side rails 65, only one of which is shown, and cross members 67, the ends thereof shown in phantom, connected to the side rails 65.

Also disposed on the rear wall on the pipes 9 and 11 in FIG. 1 is a winch 51 having pulleys 53 and 55 for reeling in and out cables 47 and 49, the cables being connected to the unconnected ends of the pipes 29 and 31. As an alternative, as shown in FIG. 2, the winch 51 of FIG. 1 can be replaced by a hook 63 secured to the ends of the cables 47 and 49 which can be secured to a power providing device, such as a tractor or the like.

In operation, the front wall which includes pipes 29 and 31 is rotated about pivots 43 and 45 so that a portion of the front wall rests parallel to and on the ground as shown in FIG. 2. The bale of hay 73 is then rolled onto the front wall and the winch 51 is rotated so that the cables 47 and 49 rotate the front wall about the pivots 43 and 45 toward the winch. The bale will ultimately roll toward the winch 51 and become positioned between the rear wall, the front wall and the side walls with a portion of the front wall extending over the top of the bale due to the curvature in the pipes 29 and 31. Feeding of livestock can be provided due to the spacing of the pipes which permit the heads of the livestock to enter into the manger between the pipes to retrieve the hay. The winch can be rotated as the bale diminishes in size to maintain a pressure on the base.

Though the invention has been described with reference to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A bale manger which comprises:
   (a) a bed and rear wall extending substantially normal to said bed; and
   (b) a front wall opposing and spaced from said rear wall, said front wall pivotally connected about a pivot to an end portion of said bed, said front wall having a bend therein to permit a first portion of said front wall remote from said bed, when said front wall is appropriately pivoted, to lie in a plane parallel to and below said bed with a second portion of said front wall between said bed and said first portion making an obtuse angle with said first portion.

2. The bale manager of claim 1 further including means disposed below said bed and secured to said bed to maintain said bed in an elevated position.

3. The bale manger of claim 1 further including a pair of side walls making an enclosure with said bed, front wall and rear wall when said front wall is pivoted in a direction toward said rear wall.

4. The bale manger of claim 2 further including a pair of side walls making an enclosure with said bed, front wall and rear wall when said front wall is pivoted in a direction toward said rear wall.

5. The bale manger of claim 3 wherein said side walls are secured to said bed.

6. The bale manger of claim 4 wherein said side walls are secured to said bed.

7. The bale manger of claim 1 further including means to cause said front wall to rotate about said pivot toward said rear wall.

8. The bale manger of claim 2 further including means to cause said front wall to rotate about said pivot toward said rear wall.

9. The bale manger of claim 3 further including means to cause said front wall to rotate about said pivot toward said rear wall.

10. The bale manger of claim 4 further including means to cause said front wall to rotate about said pivot toward said rear wall.

11. The bale manger of claim 5 further including means to cause said front wall to rotate about said pivot toward said rear wall.

12. The bale manger of claim 6 further including means to cause said front wall to rotate about said pivot toward said rear wall.

13. The bale manger of claim 7 wherein said means to cause said front wall to rotate is a pulley secured to said rear wall and a cable securable to said front wall and rotatable by said pulley.

14. The bale manger of claim 8 wherein said means to cause said front wall to rotate is a pulley secured to said rear wall and a cable securable to said front wall and rotatable by said pulley.

15. The bale manger of claim 9 wherein said means to cause said front wall to rotate is a pulley secured to said rear wall and a cable securable to said front wall and rotatable by said pulley.

16. The bale manger of claim 10 wherein said means to cause said front wall to rotate is a pulley secured to said rear wall and a cable securable to said front wall and rotatable by said pulley.

17. The bale manger of claim 11 wherein said means to cause said front wall to rotate is a pulley secured to said rear wall and a cable securable to said front wall and rotatable by said pulley.

18. The bale manger of claim 12 wherein said means to cause said front wall to rotate is a pulley secured to said rear wall and a cable securable to said front wall and rotatable by said pulley.

* * * * *